United States Patent
Saenger

(10) Patent No.: US 7,439,495 B2
(45) Date of Patent: Oct. 21, 2008

(54) NUCLEAR IMAGING PROBE

(75) Inventor: Richard Saenger, Chatillon (FR)

(73) Assignee: Schlumberger Technology Corporation, Sugar Land, TX (US)

(*) Notice: Subject to any disclaimer, the term of this patent is extended or adjusted under 35 U.S.C. 154(b) by 203 days.

(21) Appl. No.: 11/458,715

(22) Filed: Jul. 20, 2006

(65) Prior Publication Data
US 2007/0154341 A1    Jul. 5, 2007

(30) Foreign Application Priority Data
Aug. 30, 2005   (EP)   ................... 05291803

(51) Int. Cl.
G01V 5/12      (2006.01)
G01V 3/18      (2006.01)
E21B 49/00     (2006.01)

(52) U.S. Cl. .............. 250/269.3; 73/152.02; 73/152.05; 73/152.06; 73/152.14; 250/269.1

(58) Field of Classification Search .............. 250/269.1, 250/269.3; 73/152.02, 152.05, 152.06, 152.14
See application file for complete search history.

(56) References Cited

U.S. PATENT DOCUMENTS

| | | | |
|---|---|---|---|
| 2,760,078 A | 8/1956 | Youmans | |
| 4,109,153 A | 8/1978 | Brachet et al. | |
| 4,857,728 A | 8/1989 | Smith, Jr. et al. | |
| 5,723,781 A * | 3/1998 | Pruett et al. | .............. 73/152.18 |

FOREIGN PATENT DOCUMENTS

| EP | 0379813 | 1/1995 |
|---|---|---|
| EP | 0860715 | 6/2006 |

OTHER PUBLICATIONS

Knoll, G, Radiation Detection and Measurement, 2000, John Wiley & Sons, Inc., XP002366233, pp. 488-489.

* cited by examiner

*Primary Examiner*—David P. Porta
*Assistant Examiner*—Casey Bryant
(74) *Attorney, Agent, or Firm*—Jamie Castano

(57) ABSTRACT

A nuclear imaging probe 1 for measuring the density of a subsurface formation GF in a limited zone surrounding a well-bore hole WBH. The probe comprises: a pad 2 having a face arranged so as to be positioned in contact with a well-bore wall WBW, at least one radioactive source 4 arranged within the pad for transmitting incident photons PI towards the well-bore wall, and at least one sensor 5 spaced away from the radioactive source and isolated from the radioactive source by a shield 6 arranged into the pad for receiving photons scattered PS by the limited zone.

8 Claims, 8 Drawing Sheets

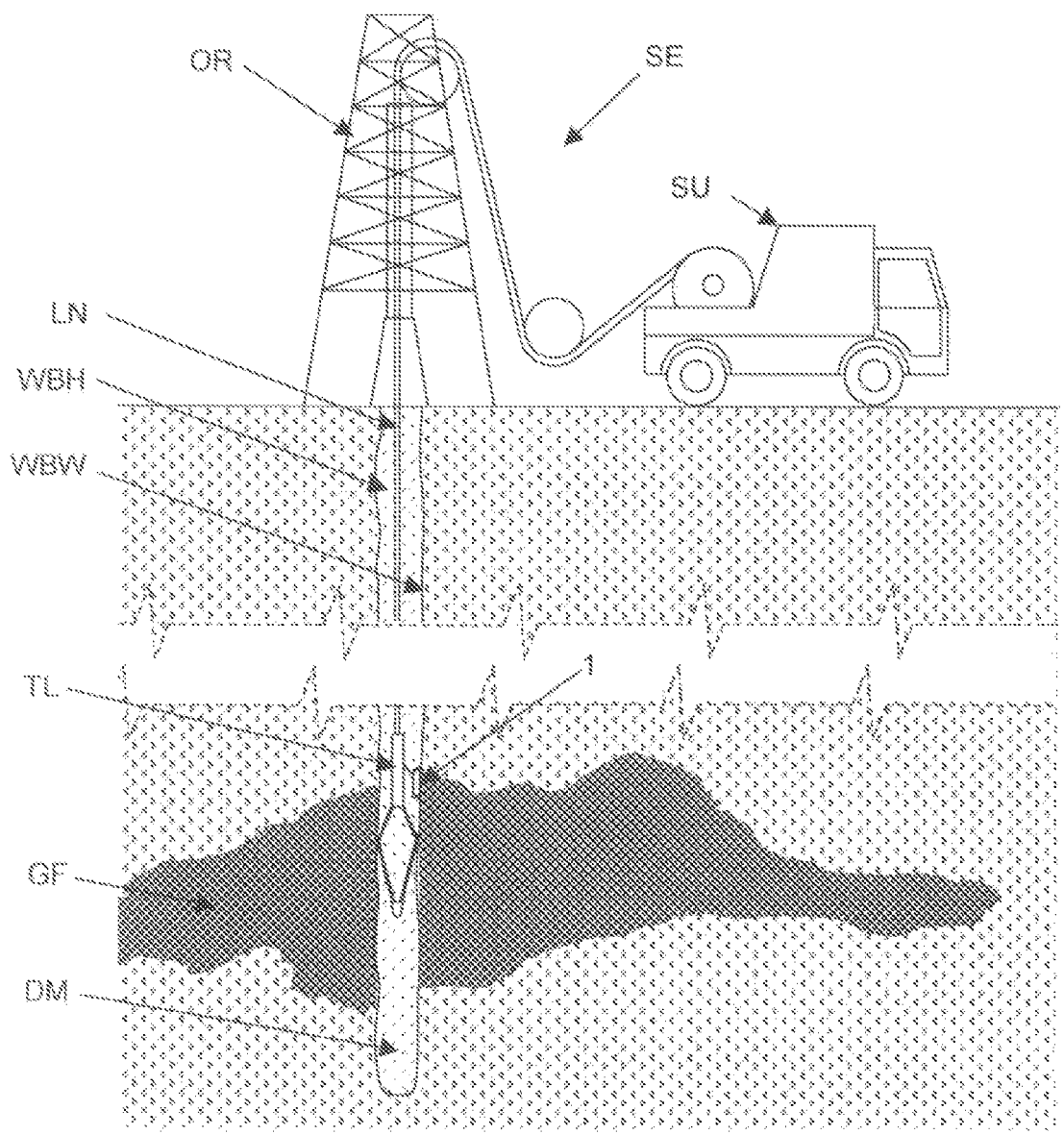
FIG. 1.A

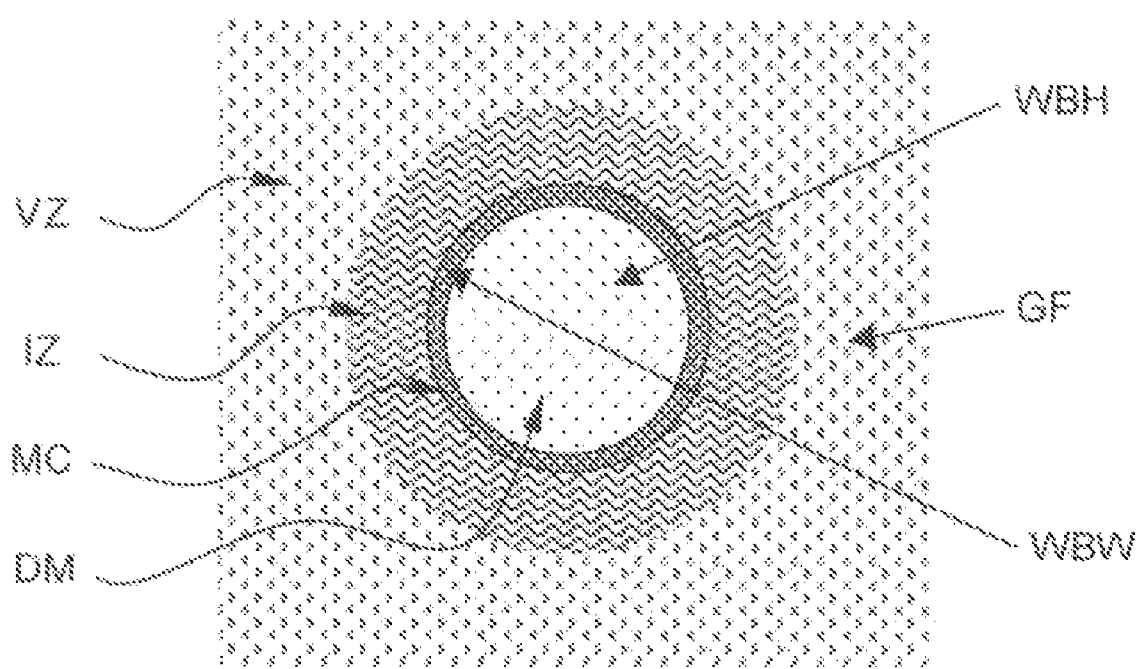
FIG. 1.B

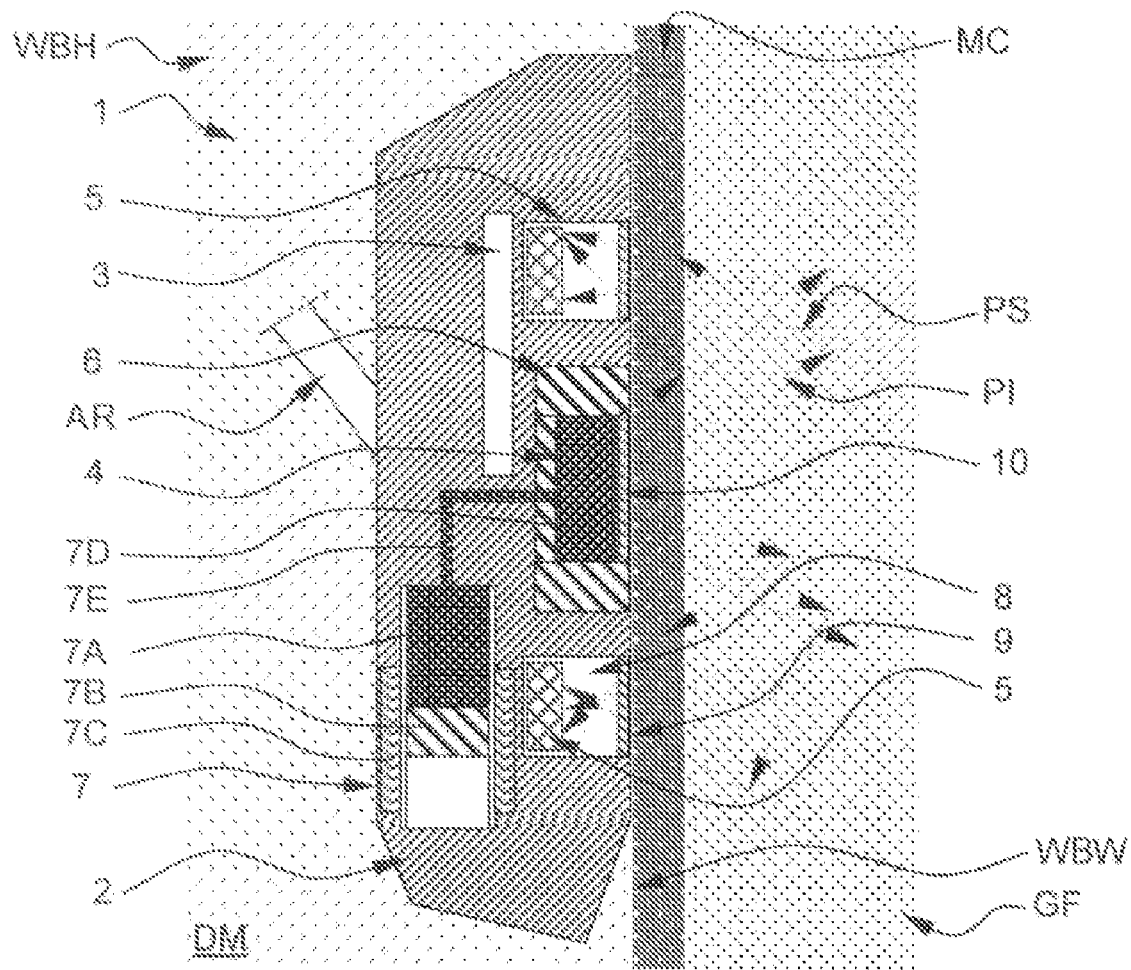
FIG. 2.A

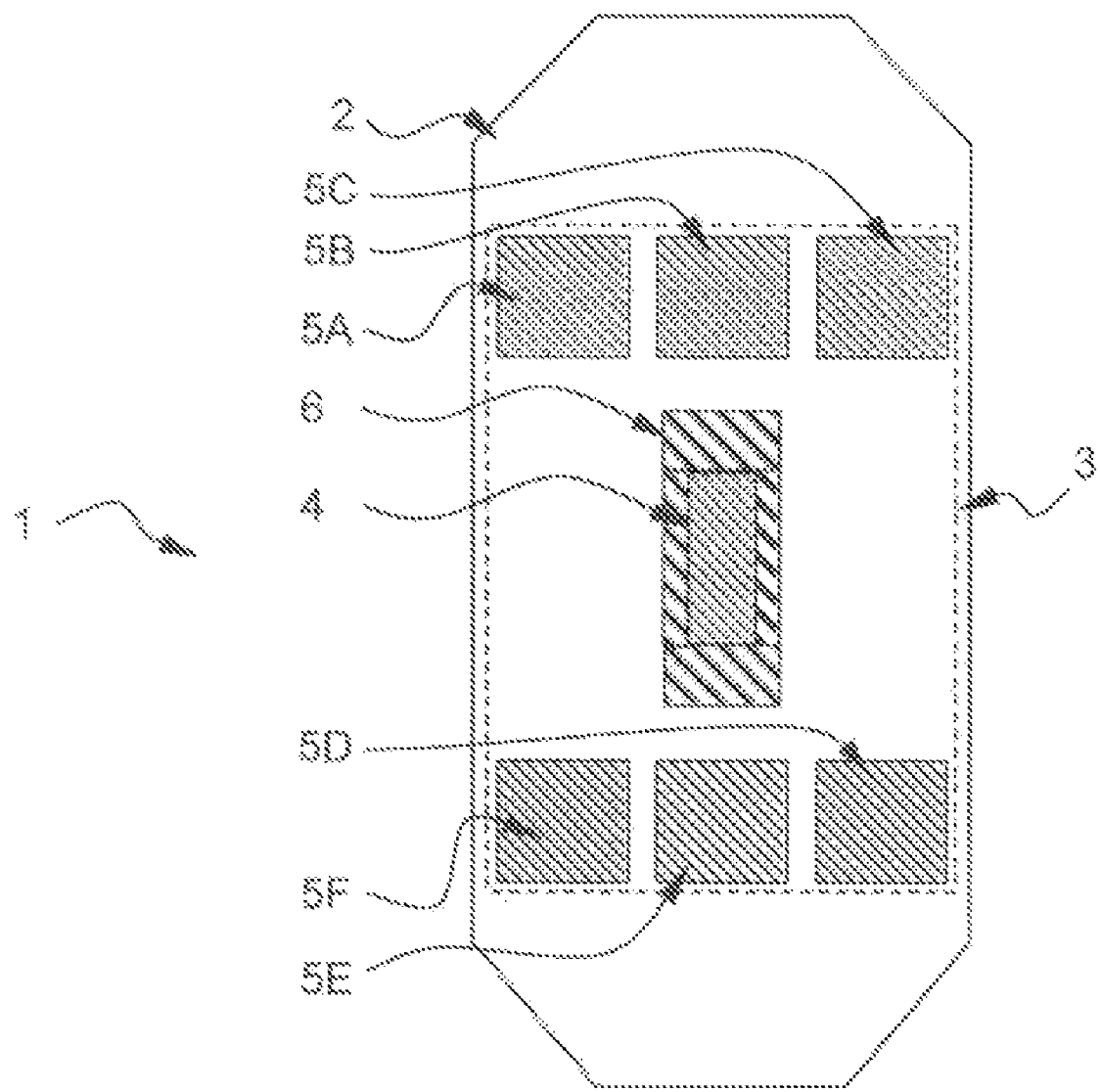
FIG. 2.B

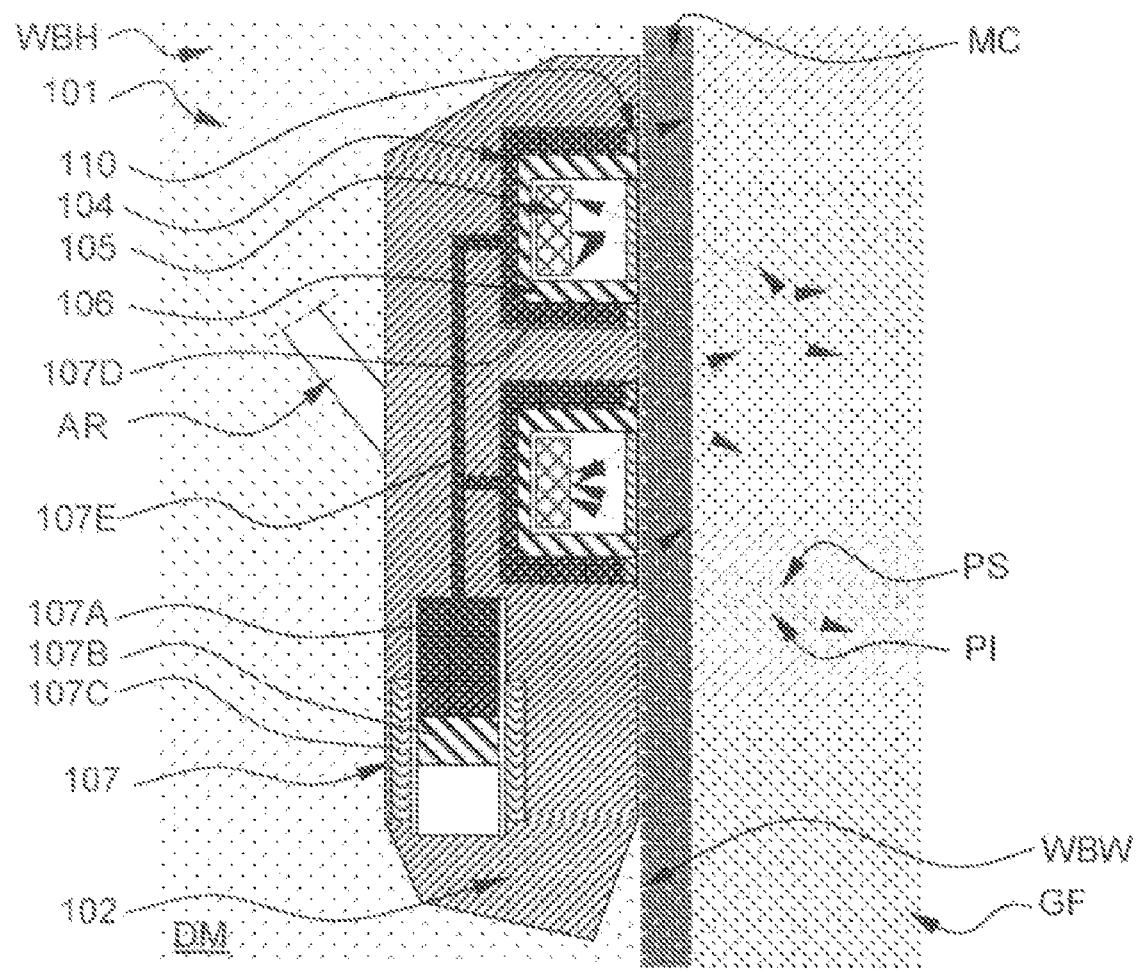
FIG. 3.A

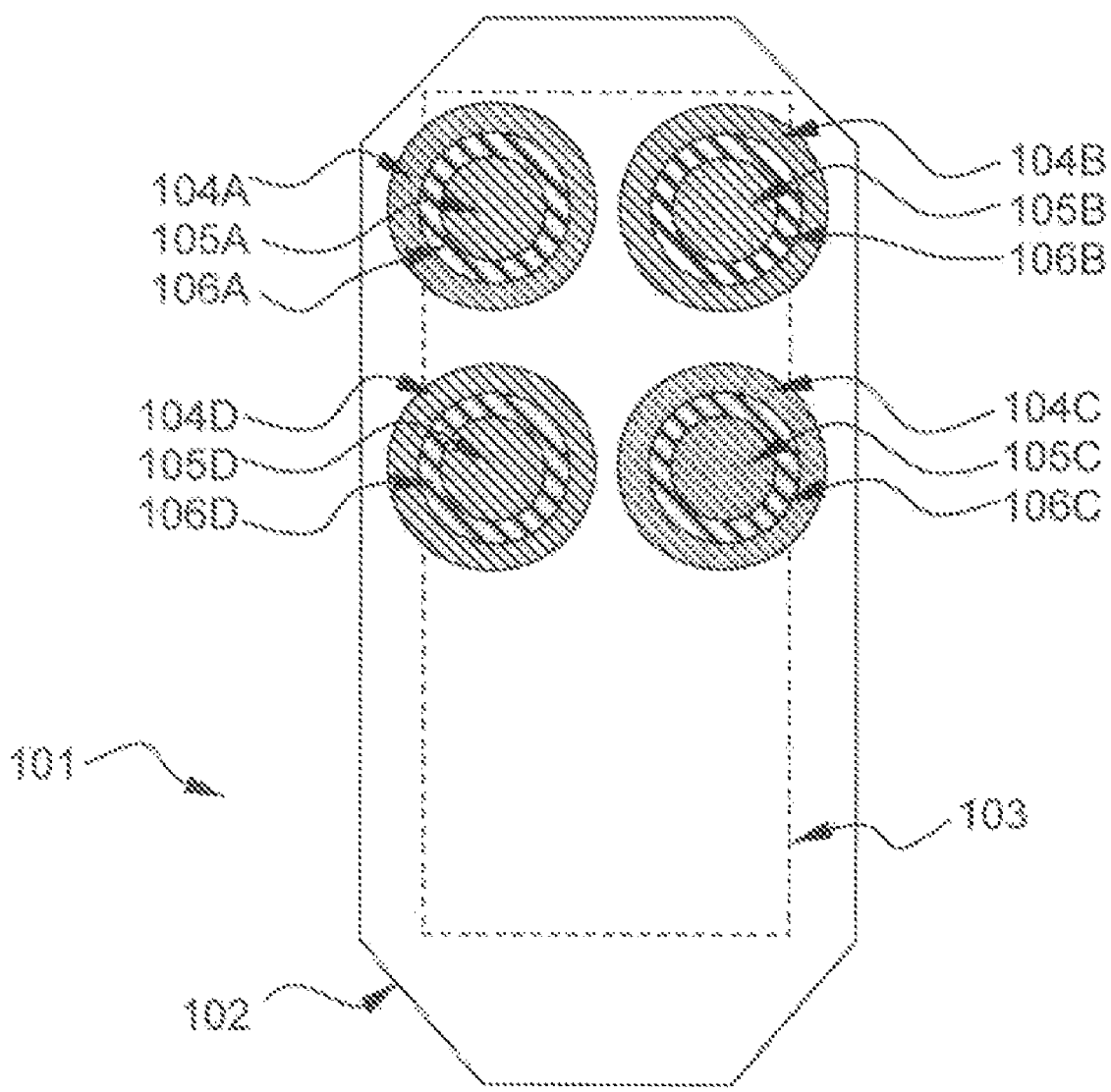
FIG. 3.B

NUCLEAR IMAGING PROBE

FIELD OF THE INVENTION

The invention relates to a nuclear imaging probe for measuring the density of a subsurface formation in a limited zone surrounding a bore hole.

Another aspect of the invention relates to a logging tool comprising such a probe for performing logs of subsurface formation bore hole.

A particular application of the probe and the logging tool according to the invention relates to the oilfield services industry.

BACKGROUND OF THE INVENTION

Logging devices which measure formation properties based on nuclear measurement are known. Typically, the logging device includes a nuclear source and spaced Geiger-Muller detectors or scintillating crystals associated with photomultiplier tubes mounted in a pad that is applied against a bore hole wall.

However, such logging devices are not reliable in hostile environment (high temperature, high pressure). Further, they require high polarization voltage which is not easy to provide with regards to down-hole conditions. Finally, they are not adapted for performing pixelized density imaging of a geological formation.

SUMMARY OF THE INVENTION

One goal of the invention is to propose a nuclear imaging probe for measuring the density of a subsurface formation in a limited zone surrounding a bore hole that overcomes at least one of the drawbacks of the prior art, in particular which is better adapted to measurement in hostile down-hole environment applications than prior art device.

According to the invention, it is proposed a nuclear imaging probe for measuring the density of a subsurface formation in a limited zone surrounding a well-bore hole, the probe comprising:
- a pad having a face arranged so as to be positioned in contact with a well-bore wall,
- at least one radioactive source arranged within the pad for transmitting incident photons towards the well-bore wall,
- at least one sensor spaced away from the radioactive source and isolated from the radioactive source by a shield arranged into the pad for receiving photons scattered by the limited zone, and
- the radioactive source comprises a pumping arrangement comprising a container, a piston, a piston actuator and at least one emission chamber, the container being filled with a radioactive gas, a pumping tube coupling the container to the at least one emission chamber, the piston actuator activating the piston for pumping the radioactive gas from the container into the at least one emission chamber when measurement are performed.

The sensor may be a diamond sensor coupled to an electronic arrangement, the electronic arrangement being arranged to polarize the sensor and to determine density of the subsurface formation based on scattered photons measured by the sensor.

Advantageously, the pad comprises a plurality of sensors disposed according to a matrix.

The nuclear imaging probe according to the invention is reliable in hostile environment, withstanding temperature superior to 200° C.

The probe is simple to implement because the diamond sensor requires polarization high voltage in the low range of around 50 V to 400 V. The diamond sensor may measure photons in a large energy range from 40 keV to 20 MeV, while showing low dependence on photons energy. It further shows a fast charge collection time, around $10^{-8}$ s.

More over, when the probe comprises several sensors, it forms a micro-density imager. It is possible to provide pixelized images of the geological formation, for example with a pixelization of 6×6 mm surface.

Finally, the radioactive source can be control down-hole, enabling adjusting the source strength.

These and other aspects of the invention will be apparent from and elucidated with reference to the embodiments described hereinafter.

BRIEF DESCRIPTION OF THE DRAWINGS

The present invention is illustrated by way of example and not limited to the accompanying figures, in which similar references indicate similar elements:

FIG. 1.A schematically illustrates a typical onshore hydrocarbon well location;

FIG. 1.B schematically illustrates a top view of a bore hole in a geological formation;

FIGS. 2.A and 2.B schematically show a cross-section side view and an underneath view of a nuclear imaging probe according to a first embodiment of the invention, respectively;

FIGS. 3.A and 3.B schematically show a cross-section side. view and an underneath view of a nuclear imaging probe according to a second embodiment of the invention, respectively;

DETAILED DESCRIPTION OF THE INVENTION

Figure 4:
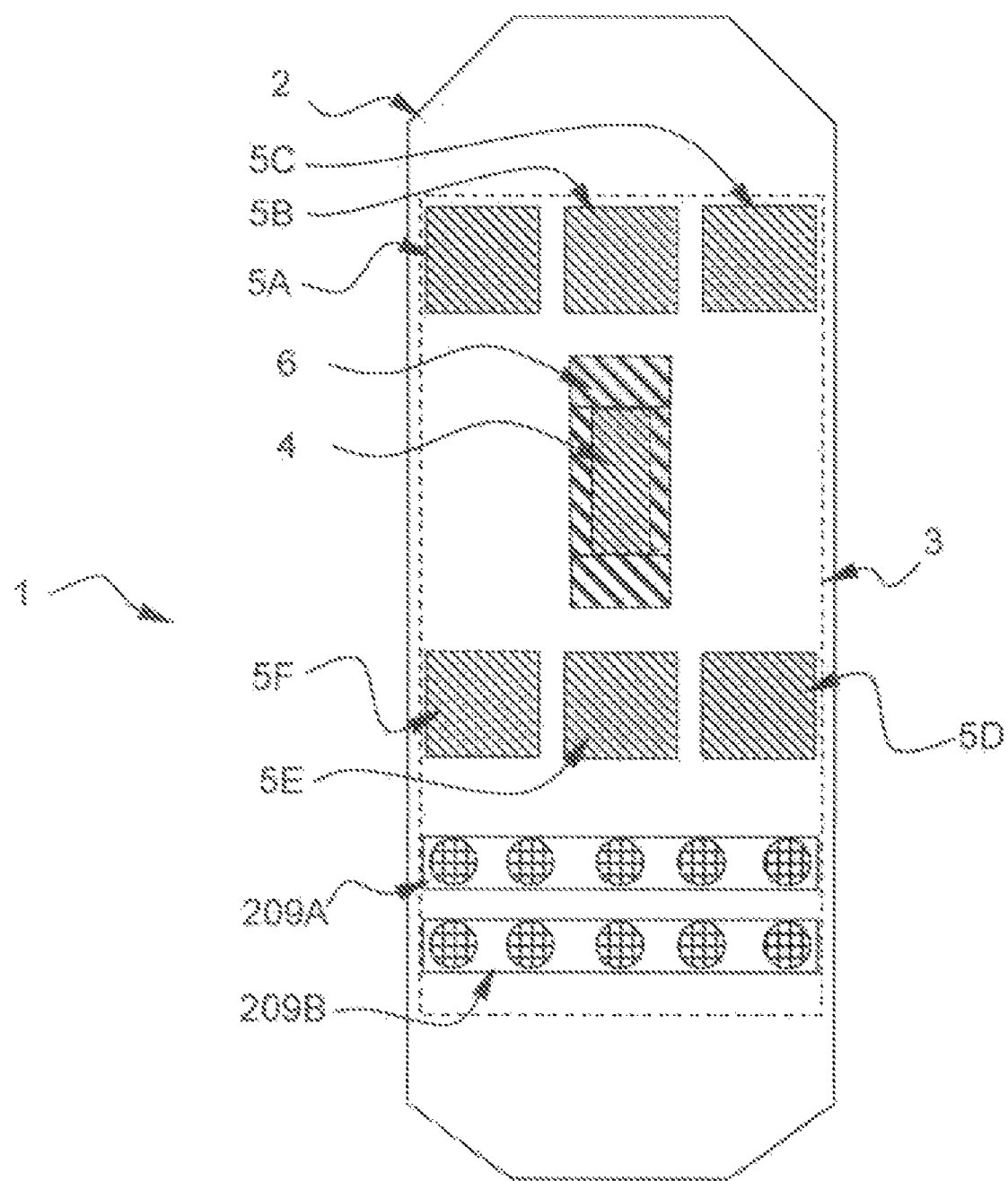
FIG. 4 illustrates an alternative embodiment of the first embodiment of the invention shown in FIG. 2.

FIG. 1.A schematically shows a typical onshore hydrocarbon well location and surface equipments SE above a hydrocarbon geological formation GF after drilling operation has been carried out. At this stage, i.e. before a casing string is run and before cementing operations are carried out, the wellbore is a bore hole WBH filled with a fluid mixture DM. The fluid mixture DM is typically a mixture of drilling fluid and drilling mud. In this example, the surface equipments SE comprises an oil rig OR and a surface unit SU for deploying a logging tool TL in the well-bore WB. The surface unit may be a vehicle coupled to the logging tool by a line LN. Further, the surface unit comprises an appropriate device for determining the depth position of the logging tool relatively to the surface level. The logging tool TL may comprise a centralizer. The centralizer comprises a plurality of mechanical arm that can be deployed radially for contacting the well-bore wall WBW. The mechanical arms insure a correct positioning of the logging tool along the central axis of the well-bore hole. The logging tool TL comprises various sensors and provides various measurement data related to the hydrocarbon geological formation GF and/or the fluid mixture DM. These measurement data are collected by the logging tool TL and transmitted to the surface unit SU, for example via telemetry on the logging cable. The surface unit SU comprises appropriate electronic and software arrangements for processing, analyzing and storing the measurement data provided by the logging tool TL.

The logging tool TL comprises a nuclear imaging probe 1 for measuring the density of a subsurface formation according to the invention. Once the logging tool is positioned at a desired depth, the probe 1 can be deployed from the logging tool TL against the bore hole wall WBW by an appropriate deploying arrangement, for example an arm.

FIG. 1.B is a top cross-section view in a geological formation GF. The bore hole WBH is filled with the fluid mixture DM. The bore hole wall screens the particles of mud suspended into the fluid mixture. Thus, a shallow layer of mud, the so-called mudcake MC is generally formed on the bore hole wall WBW. A flushed or invaded zone IZ forming a first concentric volume surrounds the bore hole WBH. The fluid mixture DM generally filtrates through the mudcake MC and penetrates into the formation, forming the invaded zone IZ. The radial depth of the invaded zone varies from a few inch to a few feet. A true or virgin zone VZ surrounds the invaded zone IZ. It is only filled with the natural geological formation fluid. A further transition zone may be present between the invaded zone IZ and the virgin zone VZ.

FIGS. 2.A and 2.B show the nuclear imaging probe 1 according to a first embodiment.

The nuclear imaging probe 1 comprises a pad 2. The pad is a conductive metal housing, for example made in a metallic material like stainless steel. The pad 2 has a face arranged to be positioned in contact with a bore hole wall WBW.

The pad 2 is coupled to the tool TL by an arm AR (partially shown). The arm AR enables the deployment of the nuclear imaging probe 1, namely the deployment of the pad 2, from the tool TL against the bore hole wall WBW. In this example, the bore hole wall WBW consists in the formation GF covered by the mudcake MC. However, in some case, the mudcake may not be present so that the bore hole wall WBW consists in the formation GF itself.

The nuclear imaging probe 1 comprises an electronic arrangement 3, a radioactive source 4, and a plurality of sensors 5.

The radioactive source 4 is arranged into the pad for emitting photons towards the well-bore wall and into the mudcake MC and the geological formation GF. The radioactive source 4 comprises a pumping arrangement 7.

The pumping arrangement 7 comprises a container 7A, a piston 7B, a piston actuator 7C and at least one emission chamber 7D coupled to the container by a pumping tube 7E. The emission chamber 7D may be a cavity arranged into the pad and isolated from the exterior by a window 10. The sealed window 10 maintains the radioactive gas in the emission chamber 7D and enables transmission of the incident photons into the mudcake and the geological formation. For example, a Boron carbide window has the ability to Withstand high mechanical stress while minimizing photon absorption.

The container 7A is filled with a radioactive gas. The container 7A may be a sealed stainless steel container. The radioactive gas may be pumped inside or outside the emission chamber 7D via the pumping tube 7E when the piston 7B is actuated by the piston actuator 7C. The pumping tube 7E may be coupled to a plurality of emission chamber 7D. The radioactive source 4 is activated when the emission chamber 7D is filled with the radioactive gas.

The actuation of the piston 7B by the piston actuator 7C may be implemented by magnetic coupling.

As an alternative, the container 7A, the piston 7B and the piston actuator 7C may be fitted within the tool itself. The radioactive gas is provided to the emission chamber through a pumping tube 7E via the arm AR connecting the pad 2 to the tool TL.

The radioactive gas may be Krypton Kr85, emitting at 514 keV. The concentration, for example up to 370 kBq/cc could be adjusted down-hole by varying the gas pressure in order to adjust the source strength. In addition, the radioactive gas may be stored inside the tool permanently, the gas being pumped into the emission chambers of the pad when measurement occurs.

The sensors 5 are spaced from the radioactive source 4. They are further isolated from the radioactive source by a shield 6. The sensors are arranged into the pad for receiving the photons scattered by a limited zone surrounding the bore hole wall, namely the mudcake MC and the geological formation GF surrounding the bore hole wall.

The shield is, for example, a Tungsten shield in order to minimize the direct transmission of photons from the radioactive source to the sensors, namely without having been diffused through the surrounding formation. The shield may surround the radioactive source and/or each detector.

Each sensor 5 is mounted into a cavity 8 of the pad and is isolated from the pad covered by a window 9, for example a Boron Carbide window.

As an example, the sensors may be diamond sensors. The diamond sensor comprises a diamond layer deposited onto a Silicium substrate. Preferably, the Silicium substrate is a (111) oriented crystal of low resistivity, for example 8 $\Omega$.cm, manufactured according to known process of the electronic industry. The diamond layer may have a thickness of 25 µm, or more, and is manufactured by a chemical vapor deposition process known in the electronic industry.

Alternatively, the diamond layer may advantageously be replaced by an element made of a natural diamond.

Typically, the mechanical properties of the diamond layer are: a hardness of around 10000 kg/mm2, a thermal expansion of $1.1*10-6$ per ° K., a thermal conductivity of 22 W/cm/° K. and a mass density of 3.5 g/cc. The typical size of the diamond layer is 5×5×1.7 mm2. Advantageously, it is chemically stable up to 500° C.

Typically, the electrical properties of the diamond layer are: a resistivity of $10^{13}$ $10^{16}$ $\Omega$.cm, a high electrical mobility of $2.7*10^7$ cm/s for electrons and $10^7$ cm/s for hole-carriers, an energy gap of 5.45 eV, a breakdown voltage of $10^7$ V/cm, an energy required to create electron/hole pair of 13 eV and a charge collection time of 100 ps to 1000 ps.

The diamond sensor may be polarized by a voltage ranging from 50 V to 400 V in order to accurately detect the high energy scattered photons.

The sensitivity of the diamond sensor to high energy photons of 50 keV is of the order of $15.10^{-9}$ A/Gy/s for a polarization voltage of 80V. As an alternative enabling sensitivity improvement, a plurality of diamond sensors may be mounted in parallel, in a stack, etc. . . .

FIG. 2.B schematically shows a view from underneath of the nuclear imaging probe according to the first embodiment of the invention. The nuclear imaging probe 1 comprises six sensors 5A, 5B, 5C, 5D, 5E and 5F disposed according to a matrix surrounding a single radioactive source 4. The radioactive source is sensibly positioned at the center of the matrix and surrounded by a shield 6.

Figure 5:
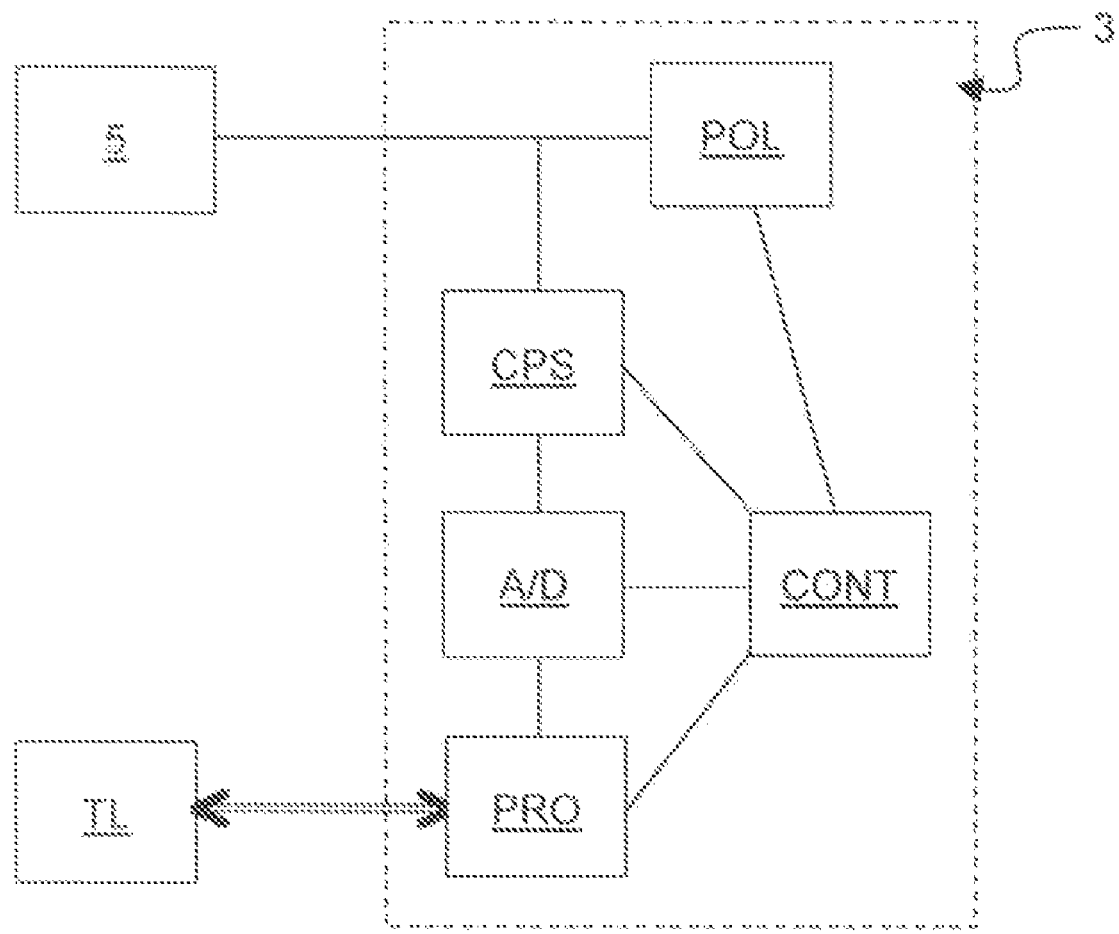
FIG. 5 schematically illustrates an electronic arrangement associated with the nuclear imaging probe of the invention.

Each sensor is coupled to the electronic arrangement 3. FIG. 5 shows an example of the electronic arrangement 3.

The electronic arrangement comprises a polarizing module POL, a measuring module CPS, a digitizing and filtering module A/D, a processing module PRO and a controlling module CONT.

The polarizing module POL is arranged so as to electrically polarize each diamond sensor 5. The measuring module CPS is arranged to count the number of photon detected by each diamond sensor 5. The signal provided by the measuring module is amplified, filtered and digitized by the digitizing and filtering module A/D. The numerical signal generated by the digitizing and filtering module A/D is processed by the processing module PRO. The processing module PRO may comprise appropriate memory for storing the measurements or may further determine density of the subsurface formation based on the measurements of the diamond sensor. The controlling module CONT is coupled to all the others modules and controls their operations.

One or more coaxial cables (not shown) may be run though the arm AR for connecting the electronic arrangement 3 with the tool TL. The tool TL contains the bulk of the down-hole electronics and provides electrical voltage supply energy and control commands, and gathers measurements from the nuclear imaging probe 1. Alternatively, the electronic arrangement 3 may comprise a signal generation, acquisition, processing and data communication module (not shown) for directly transmitting measurements to the surface equipment and receiving control commands from it.

The nuclear imaging probe operates as follows.

Once the pad is positioned in contact with a well-bore wall, the radioactive source transmits incident photons PI (gamma rays) into the mudcake and the geological formation surrounding the bore hole wall. Due to the Compton and/or photoelectric effect, the interaction of an incident photon PI with the mudcake MC or the geological formation GF material generates a recoil electron (not represented) and a scattered photon PS. The measurement of the photons backscattered by the geological formation GF surrounding the bore hole wall enables the determination of the density of the geological formation. The measurement of the photons back-scattered by means of a plurality of detectors enables determining a pixelized density image of the geological formation.

From the basic equation governing Compton scattering, the equation governing the backscatter of gamma rays can be deduced:

$$hv' = \frac{hv}{1 + \frac{hv}{m_0 c^2}(1 - \cos\theta)} \quad (1)$$

where h is the Planck constant, $m_0$ is the free electron mass, c is the light velocity, $\theta$ is the photon scattering angle, $v$ and $hv$ are the incident photon frequency and energy, respectively, and $v'$ and $hv'$ are the scattered photon frequency and energy, respectively.

Typically, for small scattering angles, very little energy is transferred, while for $\theta=180°$ the scattered energy is the highest.

Based on a direct model and on backscattered photons measurement, the electronic density of the formation (counts per second) measured by each detector is given by:

$$W = \alpha \rho \exp(\beta \rho - \gamma \rho P_e) + k \quad (2)$$

where $\rho$ is the formation density, $\alpha$, $\beta$, $\gamma$ are constants linked to the probe and calibrations (geometry of the probe, energy of the radioactive source . . . ), $P_e$ is the photoelectric factor determined by calibration and k is an offset determined by calibration. Preferably, a calibration is performed in a laboratory by performing measurement onto block made of aluminum Al and an iron sleeve.

The density determination is performed for each detector of the nuclear imaging probe. When, a plurality of diamond detectors is disposed according to a matrix, it is possible to obtain a pixelized density image of the geological formation GF. The interpretation of the pixelized density image enables to quantify and qualify the thin bed layers, dip and orientation of the geological formation.

Alternatively, when the tool comprises a plurality of nuclear imaging probe, the measurement may be performed. for the plurality of probes.

FIGS. 3.A and 3.B schematically show a nuclear imaging probe 101 according to a second embodiment of the invention.

The nuclear imaging probe 101 comprises an electronic arrangement 103 (only visible in FIG. 3.B for clarity purpose) a plurality of radioactive source 104, a plurality of sensors 105, a plurality of shield 106 and a pumping arrangement 107 (only visible in FIG. 3.A for clarity purpose) that are arranged into a pad 102.

The pumping arrangement 107 comprises a container 107A, a piston 107B, a piston actuator 107C and at least one emission chamber 107D coupled to the container by a pumping tube 107E. The pumping arrangement 107 is similar to the one described in relation with the first embodiment and will not be described in details. A main difference existing with the first embodiment is that, in the present example, the radioactive source 104 comprises at least one emission chamber 107D, each emission chamber surrounding the sensor. The emission chamber 107D is further coupled to the piston 107B via a more complex pumping tube 107E.

The sensor 105, for example a diamond sensor is surrounded by the emission chamber 107D. The diamond sensor 105 is separated from the emission chamber 107D by an appropriate shield 106, for example made of tungsten. Appropriate connectors (not shown) couple the diamond sensor 107 to the electronic arrangement 103. The diamond sensor is similar to the one described with regards to the first embodiment, and will not be further described.

As an example, in FIG. 3.B, four radioactive sources 104A, 104B, 104C and 104D are provided into the pad 102. Each radioactive source 104A, 104B, 104C and 104D is associated with a corresponding diamond sensor 105A, 105B, 105C and 105D, respectively, and separated by a corresponding shield 106A, 106B, 106C and 106D, respectively.

The electronic arrangement 103 is similar to the one described in relation with the first embodiment, except that the controlling module is coupled to the pumping arrangement. The controlling module controls the operation of the piston actuator.

The second embodiment is advantageous because each radioactive source is in closest vicinity to the associated diamond sensor, thus optimizing the number of backscattered photons that are detected by the associated diamond sensor and increasing the geological formation measurement accuracy and radial resolution.

FIG. 4 illustrates an alternative embodiment of the first embodiment of the invention shown in FIGS. 2.A and 2.B.

The pad 2 further comprises a plurality of resistivity sensors disposed into the pad face arranged to be positioned in contact with a well-bore wall. As an example, a first 209A and a second 209B resistivity measuring module are provided into the pad. The resistivity measuring module may also be coupled to the electronic arrangement 3. They provide mudcake measurement, for example with regards to the thickness of the mudcake. The mudcake measurements are correlated to the nuclear measurements performed by the diamond sensors 5A, 5B, 5C, 5D, 5E and 5F of the nuclear imaging probe 1.

The mud cake measurements can be used for compensation of the geological formation measurements affected by the presence of the mudcake. Further, the association of the pixelized density images with the resistivity measurements enables to determine the micro-fractures, the vuggs and the laminations of the geological formation GF.

This alternative may also be applicable to the second embodiment of the invention.

FINAL REMARKS

Though, the above mentioned described embodiments show sensors having a parallelepiped geometry (first embodiment) or a cylindrical geometry (second embodiment), it will be apparent for a person skilled in the art that other type of geometry may be suitable in order to optimize the backscattered photons detection. Further, the disposition of sensors according to a 3×3 matrix (first embodiment) or a 2×2 matrix (second embodiment) are examples. Indeed, others types of matrices with different numbers of lines and columns, and various geometrical layouts may be used in order to provide micro-density images of the formation.

A particular application of the invention relating to a wireline tool (oil-well logging) has been described. However, it will be apparent for a person skilled in the art that the invention is also applicable to a logging-while-drilling tool. A typical logging-while-drilling tool is incorporated into a bottom hole assembly attached to the end of a drill string with a drill bit attached at the extreme end thereof. Measurements can be made either when the drill string is stationary or rotating. In the latter case an additional measurement is made to allow the measurements to be related to the rotational position of the drill string in the bore hole. This can be done by making simultaneous measurements of the direction of the earth's magnetic field with a compass which can be related to a reference measurement made when the drill string is stationary.

It will also be apparent for a person skilled in the art that the invention is applicable to onshore and offshore hydrocarbon well location.

The term "pad" used hereinbefore generically indicates a contacting element with the surface of the bore hole wall. The particular contacting element shown in the Figures for maintaining the nuclear source and the detector in contact with the bore hole wall is illustrative. It will be apparent for a person skilled in the art that other suitable contacting element may be implemented, for example a sonde with a backup arm.

The same remark is also applicable to the particular probe deploying system shown in the Figures.

Finally, it will be apparent for a person skilled in the art that application of the invention to the oilfield industry is not limitative as the invention can also be used in others types of geological surveys.

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A nuclear imaging probe for measuring the density of a subsurface formation in a limited zone surrounding a well-bore hole, the probe comprises:
   a pad having a face arranged so as to be positioned in contact with a well-bore wall,
   a radioactive source arranged within the pad for transmitting incident photons towards the well-bore wall,
   at least one sensor arranged within the pad spaced away from the radioactive source and isolated from the radioactive source by a shield arranged into the pad for receiving photons scattered by the limited zone,
   wherein the radioactive source comprises a pumping arrangement comprising a container, a piston, a piston actuator and at least one emission chamber, the container being filled with a radioactive gas, a pumping tube coupling the container to the at least one emission chamber, the piston actuator activating the piston for pumping the radioactive gas from the container into the at least one emission chamber when measurements are performed.

2. A nuclear imaging probe according to claim 1, wherein the radioactive gas comprises krypton Kr85.

3. A nuclear imaging probe according to claim 1, wherein the at least one sensor is a diamond sensor coupled to an electronic arrangement, the electronic arrangement being arranged to polarize the at least one diamond sensor and to determine density of the subsurface formation based on scattered photons measured by the at least one diamond sensor.

4. A nuclear imaging probe according to claim 3, wherein the at least one diamond sensor comprises a diamond layer deposited onto a silicon substrate by a chemical vapor deposition manufacturing process.

5. A nuclear imaging probe according to claim 1, wherein the at least one sensor is surrounded by the radioactive source.

6. A nuclear imaging probe according to claim 1, wherein a plurality of sensors are disposed according to a matrix surrounding a single radioactive source.

7. A nuclear imaging probe according to claim 1, wherein the pad further comprises at least one resistivity sensor disposed into the pad face arranged to be positioned in contact with a well-bore wall.

8. A logging tool arranged to be deployed in a well-bore hole, wherein the logging tool comprises a probe according to claim 1 and a positioning arrangement for positioning the probe in contact with a well-bore wall at a determined depth in the well bore hole.

* * * * *